United States Patent [19]

Bilas

[11] Patent Number: 4,711,464
[45] Date of Patent: Dec. 8, 1987

[54] WHEEL LIFT

[76] Inventor: Michael Bilas, 2730 Columbiana-New Castle Rd., New Springfield, Ohio 44443

[21] Appl. No.: 927,962

[22] Filed: Nov. 7, 1986

Related U.S. Application Data

[63] Continuation-in-part of Ser. No. 743,982, Jun. 12, 1985, abandoned.

[51] Int. Cl.[4] .............................................. B60G 17/00
[52] U.S. Cl. .................................. 280/704; 180/24.02; 180/209; 267/169; 280/712; 280/766.1; 280/767
[58] Field of Search ............ 280/704, 712, 767, 414.5, 280/761, 763, 766, 405 R, 766.1, DIG. 1; 180/24.02, 199, 209; 267/169, 179; 248/125

[56] References Cited

U.S. PATENT DOCUMENTS

| 3,035,851 | 5/1962 | Stengelin | 280/712 |
| 3,471,168 | 10/1969 | Steinberg | 280/767 |
| 3,752,496 | 8/1973 | Meinecke | 280/767 |
| 3,826,322 | 7/1974 | Williams . | |
| 4,079,798 | 3/1978 | Ferris | 280/767 |
| 4,223,912 | 9/1980 | Reyes | 280/767 |
| 4,225,123 | 9/1980 | Hefren | 267/169 |
| 4,501,437 | 2/1985 | Becker | 280/704 |

FOREIGN PATENT DOCUMENTS

| 464565 | 4/1950 | Canada | 280/766.1 |
| 779820 | 3/1968 | Canada | 280/712 |
| 985314 | 3/1976 | Canada | 280/704 |
| 330062 | 8/1903 | France | 280/766.1 |
| 208992 | 11/1966 | Sweden | 280/766.1 |

*Primary Examiner*—John J. Love
*Assistant Examiner*—Everett G. Diederiks, Jr.
*Attorney, Agent, or Firm*—Harpman & Harpman

[57] ABSTRACT

A wheel lift device for use on an auxiliary wheel and axle assembly on vehicles to increase the load carrying capacity and stability comprises a retractable wheel assembly adjustably positioned by a piston and cylinder configuration for engagement with the ground.

7 Claims, 4 Drawing Figures

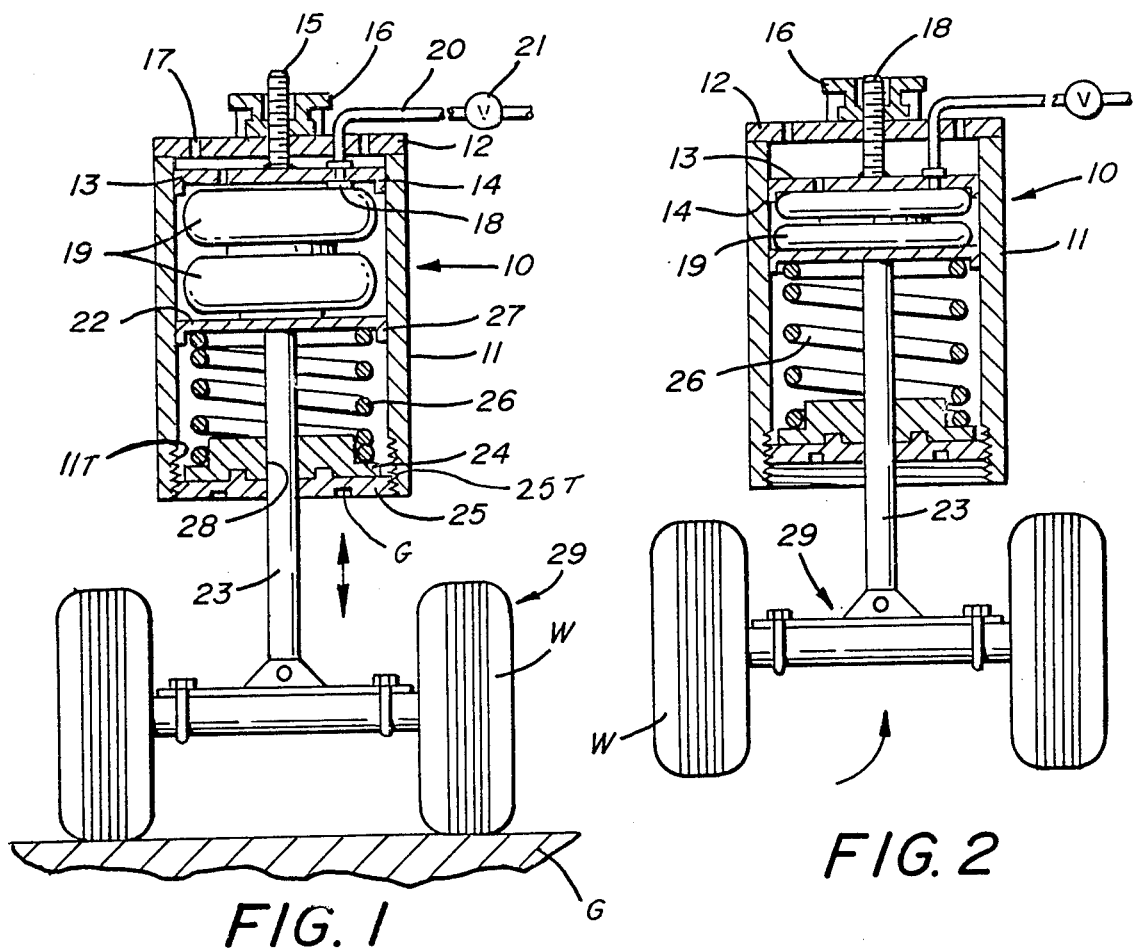
FIG. 1
FIG. 2
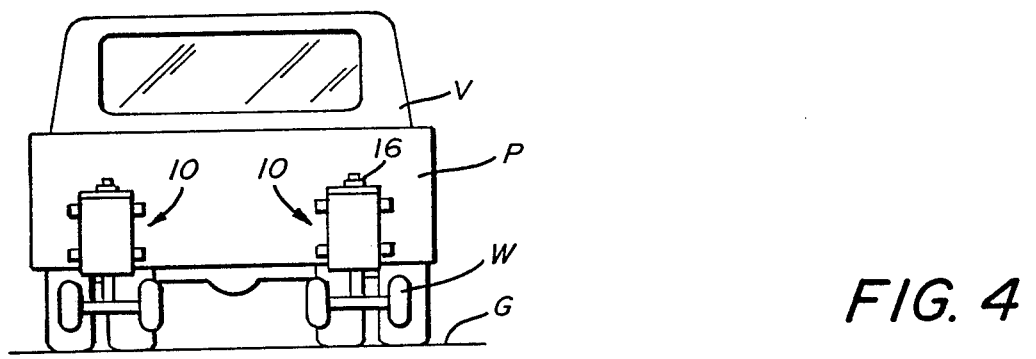
FIG. 3
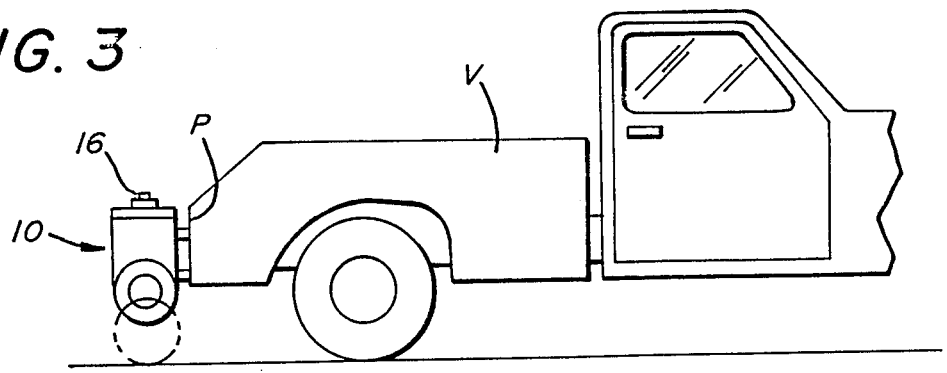
FIG. 4

WHEEL LIFT

This is a continuation in part of application filed June 12, 1985, Ser. No. 743,982, now abandoned.

BACKGROUND OF THE INVENTION

1. Technical Field

This device relates to load transfer axle assemblies that provide additional load bearing capabilities to a vehicle upon demand.

2. Description of Prior Art

Prior Art devices of this type have relied on a variety of different designs used to deploy wheel and axle assemblies on vehicles. See for example U.S. Pat. Nos. 4,079,798, 4,501,437, 3,826,322 and 3,471,168.

In U.S. Pat. No. 4,079,798 a load sharing device is disclosed wherein a wheel assembly is pivotally secured to a vehicle with a hydraulic piston and cylinder assembly engaging a lever secured to said wheel assembly and pivoting the same for engagement with the ground.

U.S. Pat. No. 4,501,437 shows an axle assembly that utilized a triangular trailer support frame having air springs engageable between a vehicle frame and an axle frame pivotally secured at one end to a support frame secured to the vehicles.

In U.S. Pat. No. 3,826,322, an accessory wheel is disclosed secured adjacent each wheel on a vehicle. The hydraulic piston and cylinder assembly is secured to the vehicle's frame and wheel supports being a wheel and axle assembly thereon. Upon activation, the piston drives the wheel and axle assembly into engagement with the ground during emergencies, taking the place of the vehicle's wheel.

SUMMARY OF THE INVENTION

A wheel lift device to provide auxiliary load carrying wheels on a vehicle without any major modifications to the vehicle. The invention comprises a wheel and axle assembly movably positioned on the vehicle for selective ground engagement by a piston and air bag configuration that is spring biased to retract the wheel assembly when not activated. The invention can easily be attached to a vehicle and requires no special mounting procedures or equipment requirement. Adjustments can be made to the device to selectively modify the amount of load carrying capacity to correspond to varying auxiliary loads.

DESCRIPTION OF THE DRAWINGS

FIG. 1 is a partial cross section of the device in actuated position.

FIG. 2 is a partial cross section of the device in retracted position.

FIG. 3 is an end plan view of a vehicle with a pair of the devices secured thereto and;

FIG. 4 is a side plan view of the vehicle having the device positioned thereon.

DESCRIPTION OF THE PREFERRED EMBODIMENT

Referring to FIGS. 1 and 2 of the drawings, a wheel lift device for auxiliary axle wheel assemblies can be seen comprising a housing 10 having a side wall 11 and a closure plate 12. An adjustable chamber reduction partition 13 is movably positioned within the housing 10 adjacent the closure plate 12 and has a down turned annular guide lip 14 extending from its perimeter edge for contact with the side wall. A threaded advance bar 15 extends centrally from said partition 13 outwardly through said closure plate 12 via a threaded drive fitting 16 which can be adjusted axially of the housing 11 via the threaded cooperation between the thread on the advance bar 15 and a thread on the drive fitting 16. The closure plate 12 and the partition 13 have a plurality of vents 17 which vent the chamber to atmosphere. An inlet fitting 18 is secured through the partition 13 and communicates with an air spring 19 within the housing 10. A high pressure supply line 20 extends from said inlet fitting to a source of compressed air (not shown) via a pressure regulated supply valve 21.

The supply line 20 is flexible and freely passes through an aperture in the closure plate 12 allowing non-restrictive movement of same into the housing 10 as required.

The air spring 19 is positioned on a movable head plate 22 having an outer diameter slightly less than that of said interior of said housing 10 as defined by said side wall 11.

A lift rod 23 is secured to the movable head plate 22 opposite the air spring and extends downwardly and outwardly from the housing 10. A housing insert 24 is adjustably secured within the open end of the housing 10 opposite the air spring 19 and defines a spring seat. The housing insert 24 can be mulitply positioned upwardly within the housing 10 by advancement of a threaded insert ring 25 effectively vertically for shortening the interior chamber of the housing 10. The insert ring includes a hole or slot G which can cooperate with a suitable tool for effecting rotation of the insert ring to cause cooperation of thread 25T on the ring 25 with thread 11T and the housing for effecting said multiple positioning.

A coil spring 26 is positioned around the housing insert 24 and abuts the bottom of the movable head plate 22 which has a down turned annular flange 27 around its perimeter. The housing insert 24 has a guide bore 28 along its vertical axis through which the rod 23 passes. An axle and wheel assembly 29 is pivotally secured to the free end of the lift rod 23 and can be pivoted from a central point on the axle and wheel assembly 29 allowing the wheels W to maintain contact with the ground on uneven terrain.

It wil be evident from the above description that by adjusting vertically the partition 13 the relative compression force available from the air spring 19 can be maintained under varying load requirements by compensating for the variation of load forces inherent in different levels of spring inflation relative to load force thereon.

Referring to FIGS. 1 through 4 of the drawings, a tow truck vehicle V can be seen having a pair of wheel lift devices secured to its rear panel P. In operation the air springs 19 are normally collapsed between the movable head plate 22 and the partition 13 as best seen in FIGS. 2 and 3 of the drawings. Upon activation the air springs 19 are expanded by compressed air via the supply line 20 from the compressed air source (not shown). As the air springs 19 fill they force the movable head plate 22 downwardly within the housing 10 overcoming the coil spring 26 compressing the same as seen in FIG. 1 and in FIG. 3 of the drawings in broken lines.

The lift rod 23 moves downwardly in the guide bore 28 advancing the axle and wheel assembly 29 downwardly into load bearing contact with the ground G as best seen in FIGS. 1 and 3 of the drawings in borken lines. The axle and wheel assembly 29 provides additional load carrying capacity and in this example is used on a tow truck which allows the same to haul larger vehicles or vehicles which present unusual lift and support problems. By adjusting the housing insert 24 within the housing 10, the relative spring rate of the coil spring 26 can be varied in response to load requirements in relation to the air spring 19.

It will thus be seen that a new and useful wheel lift has been illustrated and described and that various changes and modifications may be made therein without departing from the spirit of the invention and having thus described my invention, what I claim is:

1. An auxiliary wheel lift for use on a vehicle to provide adjustable additional load capacity comprising a housing secured to said vehicle, a vertically movable head plate within said housing and a attached lift rod extending therefrom, a partition movably positioned within said housing, an air spring positioned on one side of said head plate between said head plate and said partition, means for vertically moving said partition within said housing limiting the travel of the attached lift rod, an adjustable housing insert having a guide bore centrally located on its vertical axis registerably receiving said lift rod, a coil spring positioned on the opposite side of said head plate between said head plate and said housing insert, a wheel lift and axle assembly secured to the free end of said lift rod, means for adjustably positioning said housing insert axially in said housing, and means to activate said air spring comprising a compressed air source, supply lines and a valve in said supply lines.

2. The auxiliary wheel lift of claim 1 wherein said means for vertically moving said partition comprises a threaded advance bar secured to said paratition extending from said housing and a drive fitting.

3. An auxiliary wheel lift of claim 1 wherein said means for adjustably positioning said housing insert comprises an integral insert ring having a tool receiving slot opposite said housing insert for rotation of same, said insert ring threadably positioned within said housing opposite said partition.

4. The auxiliary wheel lift of claim 3 wherein said means for adjustably positioning said insert ring axially in said housing includes a thread on said insert ring and a thread in said housing.

5. The auxiliary wheel lift of claim 1 wherein said housing includes a side wall, and said head plate includes a flange which slideably engages said housing side wall.

6. The auxiliary wheel lift of claim 5 wherein said housing insert includes a shoulder on which said coil spring is seated and which includes a wall spaced from said housing side wall to define a gap, said coil spring having a portion thereof located in said gap to be maintained in position by said insert wall and said housing side wall.

7. The auxiliary wheel lift of claim 6 wherein said head plate flange has an inner surface aligned with said gap, said coil spring being seated against said head plate adjacent an inner surface of said flange for keeping said coil spring properly positioned.

* * * * *